United States Patent

Wong

[11] Patent Number: 5,969,479
[45] Date of Patent: Oct. 19, 1999

[54] LIGHT FLASHING SYSTEM

[75] Inventor: Wai Kai Wong, Hong Kong, The Hong Kong Special Administrative Region of the People's Republic of China

[73] Assignee: Cheerine Development (Hong Kong) Ltd., Kowloon, The Hong Kong Special Administrative Region of the People's Republic of China

[21] Appl. No.: 09/037,336

[22] Filed: Mar. 10, 1998

Related U.S. Application Data

[63] Continuation-in-part of application No. 08/963,695, Nov. 4, 1997, Pat. No. 5,894,201.

[51] Int. Cl.$^6$ .......................... H05B 37/02; H05B 37/03; A43B 23/20
[52] U.S. Cl. ..................... 315/200 A; 315/76; 315/241; 315/224; 315/360; 362/103; 36/137
[58] Field of Search .............................. 315/200 A, 76, 315/261, 224, 360, 312, 323; 362/103; 36/137; 340/573

[56] References Cited

U.S. PATENT DOCUMENTS

| | | |
|---|---|---|
| 1,597,823 | 8/1926 | Randolph . |
| 1,933,243 | 10/1933 | De Merolis et al. . |
| 2,572,760 | 10/1951 | Rikelman . |
| 2,671,209 | 3/1954 | Habib . |
| 2,671,847 | 3/1954 | Lerch . |
| 2,816,284 | 12/1957 | Campanell . |
| 2,931,893 | 4/1960 | Gonzalez Arias et al. . |
| 2,976,622 | 3/1961 | Shearouse . |
| 3,008,038 | 11/1961 | Dickens et al. . |
| 3,053,949 | 9/1962 | Johnson . |
| 3,070,907 | 1/1963 | Rocco . |
| 3,502,831 | 3/1970 | McRoskey . |
| 3,800,133 | 3/1974 | Duval . |
| 3,893,247 | 7/1975 | Dana, III . |
| 3,946,505 | 3/1976 | Dana, III . |
| 4,014,115 | 3/1977 | Reichert . |
| 4,020,572 | 5/1977 | Chiaramonte, Jr. . |
| 4,128,861 | 12/1978 | Pelengaris . |
| 4,130,951 | 12/1978 | Powell . |
| 4,158,922 | 6/1979 | Dana, III . |
| 4,253,253 | 3/1981 | McCormick . |
| 4,298,917 | 11/1981 | Ware . |
| 4,308,572 | 12/1981 | Davidson et al. . |
| 4,422,719 | 12/1983 | Orcutt . |
| 4,765,701 | 8/1988 | Cheslak . |

(List continued on next page.)

Primary Examiner—Don Wong
Assistant Examiner—Tuyet Vo
Attorney, Agent, or Firm—Brinks Hofer Gilson & Lione

[57] ABSTRACT

A light-flashing system for flashing lights on and off and for generating a pattern of illumination for a plurality of lights in response to intermittent switch closures. The system includes a battery, a plurality of light-emitting elements, a plurality of transistors which enable the illumination of the light-emitting elements, a switch, a capacitor, and a pattern-generation circuit. The battery powers the light-emitting elements and the pattern-generation circuit. The switch intermittently clocks the pattern-generation circuit and enables the flow of current in certain of the transistors, allowing illumination of certain of the light-emitting elements in response to changes in inertial forces caused by movement of the flashing light system. The capacitor is connected in parallel to the battery such that the capacitor stores electrical charge when the switch is closed and continues to enable the flow of current through certain of the transistors after the switch is opened. The pattern-generation circuit then causes at least one, but not necessarily all, of the plurality of light-emitting elements to illuminate by enabling the flow of current through certain of the transistors. As the switch intermittently opens and closes, the pattern-generation circuit is clocked through various states, and the outputs of the pattern-generation circuit enable the flow of current through certain of the transistors, allowing illumination of at least one, but not necessarily all, of the light-emitting elements in a pattern.

8 Claims, 7 Drawing Sheets

U.S. PATENT DOCUMENTS

| | | |
|---|---|---|
| 4,848,009 | 7/1989 | Rodgers . |
| 4,897,947 | 2/1990 | Kass-Pious . |
| 5,033,212 | 7/1991 | Evanyk . |
| 5,052,131 | 10/1991 | Rondini . |
| 5,070,431 | 12/1991 | Kitazawa et al. . |
| 5,128,842 | 7/1992 | Kenmochi . |
| 5,188,447 | 2/1993 | Chiang et al. . |
| 5,235,761 | 8/1993 | Chang . |
| 5,237,760 | 8/1993 | Altman et al. . |
| 5,285,586 | 2/1994 | Goldston et al. . |
| 5,303,131 | 4/1994 | Wu . |
| 5,303,485 | 4/1994 | Goldston et al. . |
| 5,343,190 | 8/1994 | Rodgers . |
| 5,408,764 | 4/1995 | Wut . |
| 5,419,061 | 5/1995 | Barrocas . |
| 5,456,032 | 10/1995 | Matsumoto et al. . |
| 5,457,900 | 10/1995 | Roy . |
| 5,463,537 | 10/1995 | Trattner et al. . |
| 5,465,197 | 11/1995 | Chien . |
| 5,477,435 | 12/1995 | Rapisarda et al. . |
| 5,500,635 | 3/1996 | Mott . |
| 5,546,681 | 8/1996 | Goldston et al. . |
| 5,550,721 | 8/1996 | Rapisarda . |
| 5,577,828 | 11/1996 | Nadel et al. . |
| 5,590,945 | 1/1997 | Simms . |
| 5,599,088 | 2/1997 | Chien . |
| 5,644,858 | 7/1997 | Bemis . |
| 5,649,755 | 7/1997 | Rapisarda . |
| 5,663,614 | 9/1997 | Weng et al. . |
| 5,664,862 | 9/1997 | Redmond et al. . |
| 5,821,858 | 10/1998 | Stone ...................................... 340/573 |
| 5,903,103 | 5/1999 | Garner ...................................... 315/76 |
| 5,909,088 | 6/1999 | Wut ...................................... 315/200 A |

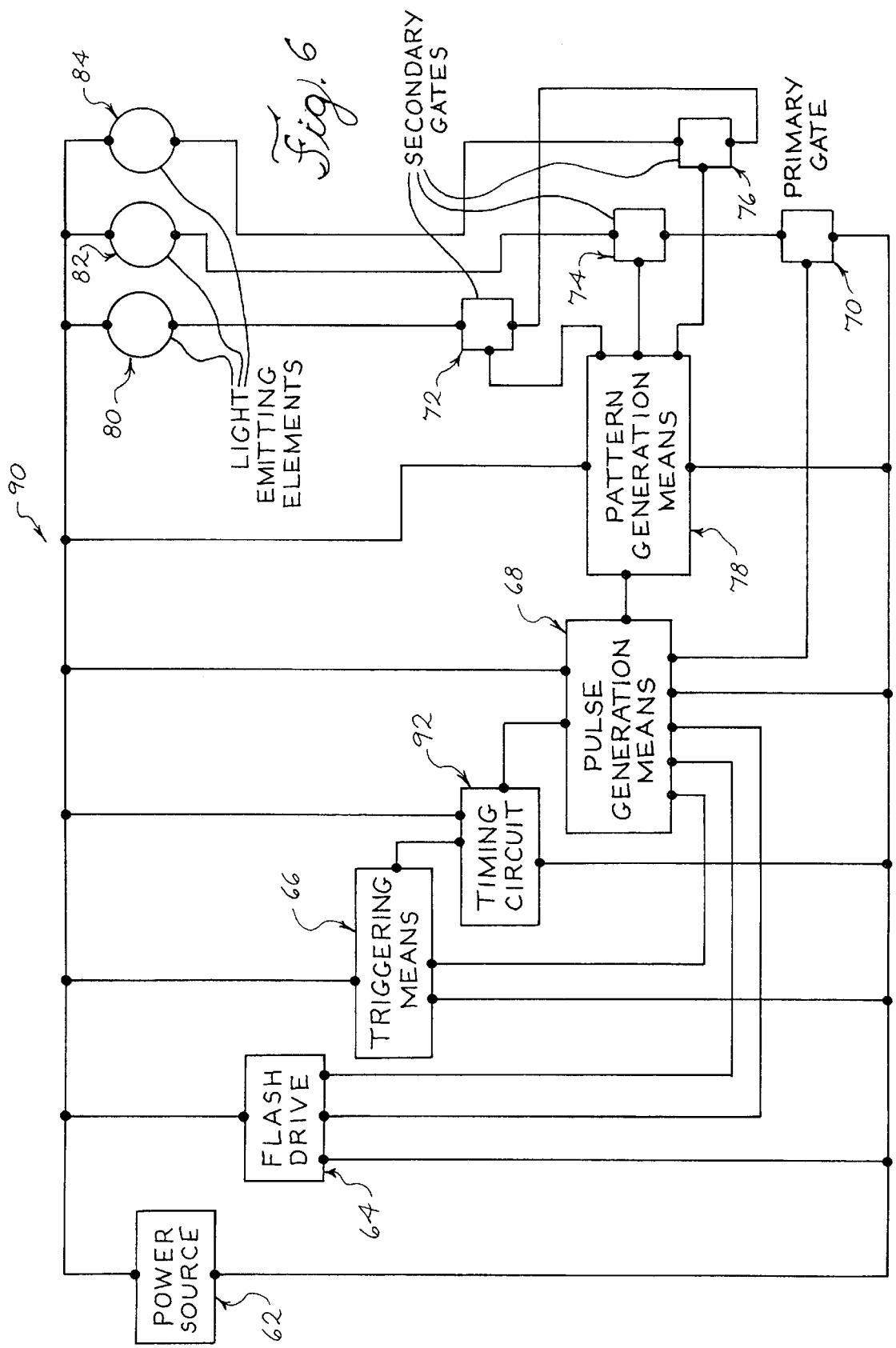

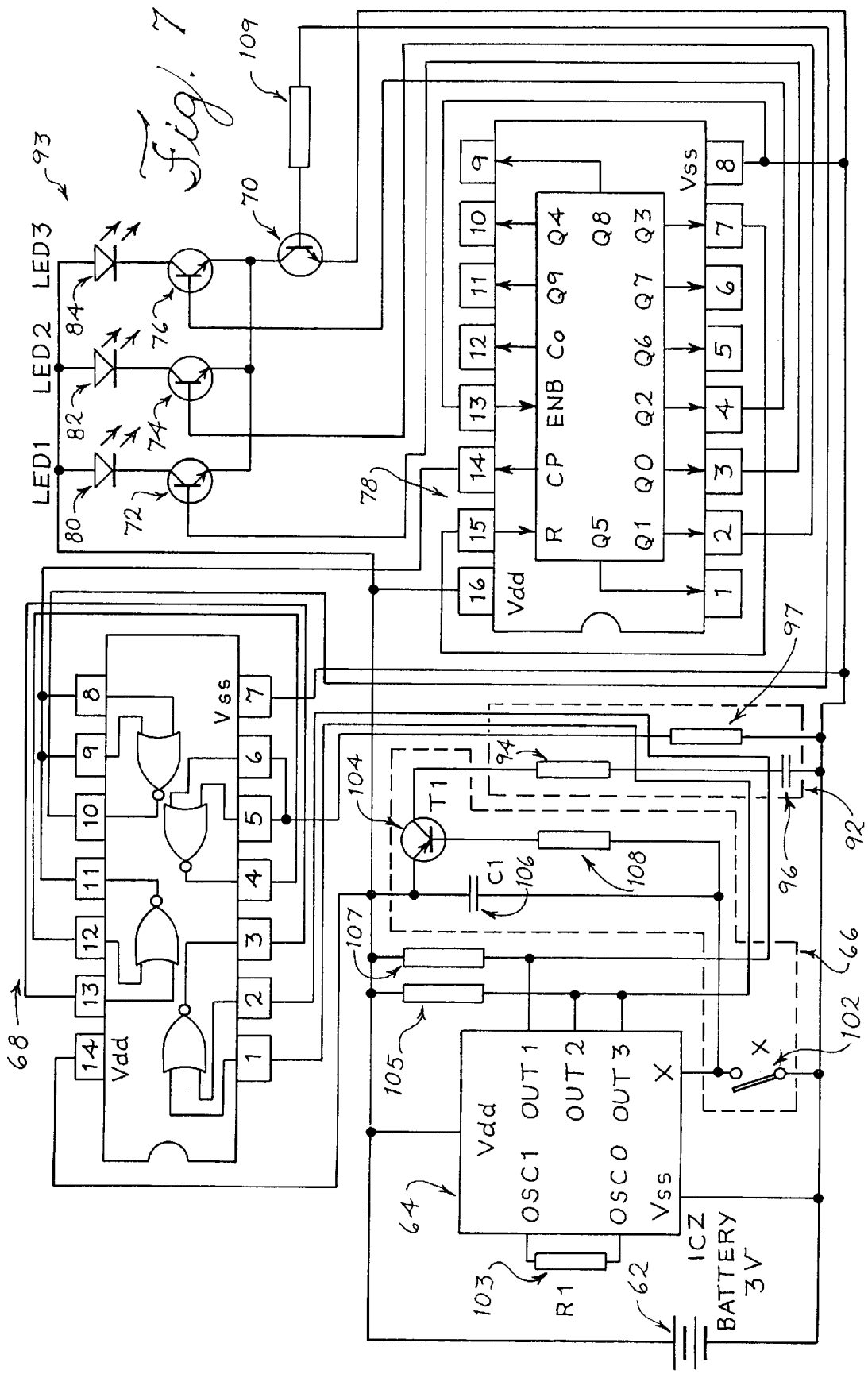

LIGHT FLASHING SYSTEM

This application is a continuation-in-part of application Ser. No. 08/963,695, entitled "Flashing Light System," filed Nov. 4, 1997, now U.S. Pat. No. 5,894,201 which application is hereby incorporated by reference herein.

BACKGROUND OF THE INVENTION

1. Field of the Invention

This invention relates generally to footwear and more particularly to an improved system for selectively illuminating lighting devices incorporated into footwear.

2. The Prior Art

It is well known to incorporate lighting devices into footwear. Lighting devices have been incorporated into a wide variety of footwear including athletic shoes and dress shoes. The incorporation of lighting devices in footwear enables the wearer to be more easily seen, especially when visibility is reduced due to inclement weather conditions or darkness. Intermittent illumination, or flashing, of these lighting devices further increases the wearer's ability to be seen as flashing lighting devices are more readily perceived by others.

There are known in the art several different implementations of footwear lighting systems that produce flashing lights. These implementations typically rely on the opening and closing of a switch to create the flashing effect. Many different types of switches have been used to create this effect. For example, pressure switches, mercury switches, and spring switches have all been used to generate flashing lights in footwear. However, in all of these systems, flashing only occurs in response to the connection or disconnection of the circuit created by the opening and closing of the switch. Furthermore, in systems with a plurality of lights, the lights are illuminated in unison, with all of the lights being illuminated at the same time.

There are also known in the art implementations of footwear lighting systems that control the illumination of a plurality of lights through a series of illumination patterns independent of changes in inertial forces on the system. Such systems, however, have been very complex and require complex control circuits to operate. For example, U.S. Pat. No. 5,457,900 to Roy, titled "Footwear Display Device," selectively illuminates certain ones of a plurality of lights in response to a velocity measurement made by the system and a control circuit containing a predetermined pattern of illumination. Once this system begins to operate, it steps through a series of illumination patterns in which the pattern of illuminated lights changes in response to the passage of time and without regard to any changes in inertial forces on the system. The steps are recorded in a complex control circuit and require the measurement of the velocity of the moving footwear to determine the duration of the changing patterns of illumination.

SUMMARY OF THE INVENTION

The present invention incorporates a power source, a plurality of light-emitting elements, a plurality of gates, a switch, a capacitor, and a pattern-generation circuit to create changing patterns of flashing lights that can be utilized in footwear. The system creates different patterns of illuminated light by utilizing a pattern-generation circuit to selectively enable the illumination of one or more light-emitting elements from a plurality of light-emitting elements. The system creates the flashing effect by utilizing a switch which is opened and closed due to changes in inertial forces acting on the footwear incorporating the invention. The switch clocks the pattern-generation circuit which, in turn, enables the illumination of the light-emitting elements. The result is a system that flashes various combinations of light-emitting elements from a plurality of light-emitting elements in response to the movement of the footwear. The changes in the combination of the illuminated light-emitting elements from the plurality of light-emitting elements only occur in response to changes in inertial forces on the system and are independent of time.

Another preferred embodiment of the present invention incorporates a power source, a flash driver circuit, a pulse-generation means, a triggering means, a plurality of gates, a means for generating a pattern of signals, and a plurality of light-emitting elements to create a changing pattern of flashing lights that can be utilized in footwear. The system utilizes a contact signal from the triggering means to clock a flash driver circuit. In response to the contact signal, the flash driver circuit delivers a plurality of output pulses which are directed to the pulse-generation means. The triggering means provides an output signal to the pulse generation means when activated so that the pulse-generation means will provide drive signals to the means for generating a pattern of signals. The outputs of the means for generating a pattern of signals cause the light-emitting elements to sequentially illuminate. The changes in the combination of the illuminated light-emitting elements only occur in response to the changes in inertial force on the system.

In another preferred embodiment of the present invention, a timing circuit may be connected with the triggering means and the pulse-generation means for controlling operation of the pulse-generation means when the contact signals from the triggering means reach a predetermined time interval. Once the contact signals from the triggering means reach the predetermined time interval, the timing circuit disengages the pulse-generation means from driving the means for generating a pattern of signals after the flash driver delivers the first output pulse. When the contact signals are below the predetermined time interval, the timing circuit remains inactive and does not affect operation of the system.

These and other features and advantages of the invention will be apparent upon consideration of the following detailed description of the preferred embodiments of the invention, taken in conjunction with the appended drawings.

BRIEF DESCRIPTION OF THE DRAWINGS

FIG. 6 is a block diagram of a preferred embodiment of a light-flashing system incorporating a timing circuit with the invention.

FIG. 7 is a schematic diagram of a preferred embodiment of a light-flashing system incorporating a timing circuit.

DETAILED DESCRIPTION OF THE PRESENTLY PREFERRED EMBODIMENTS

Figure 1:
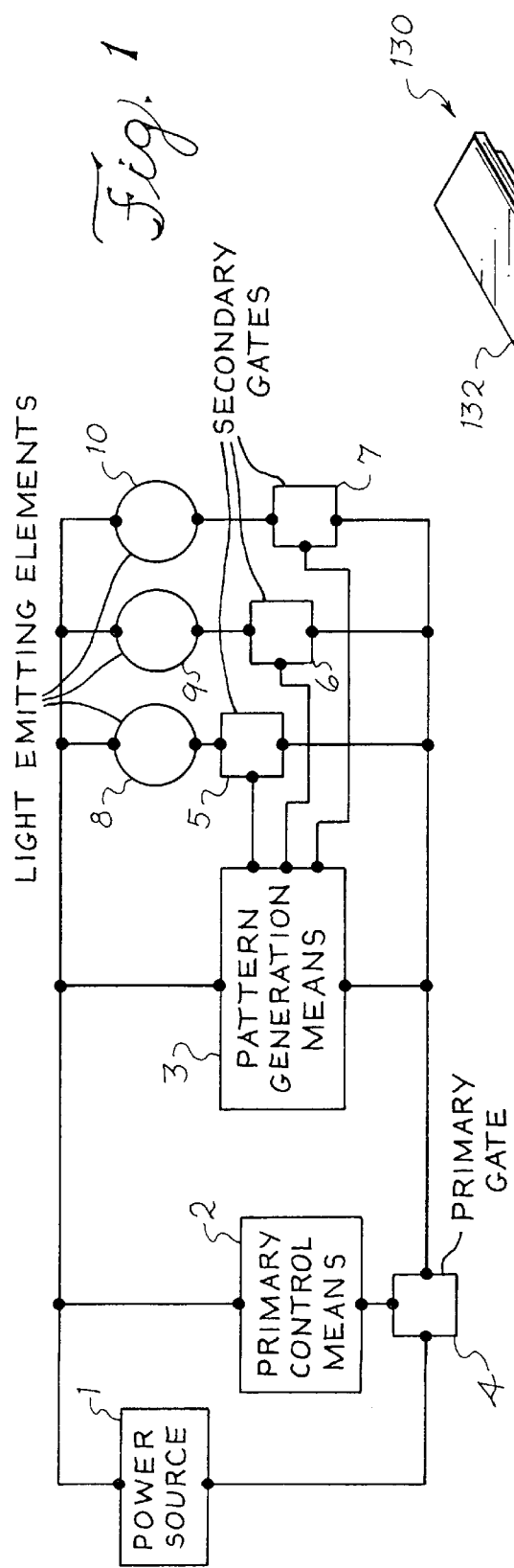
FIG. 1 is a block diagram of a preferred embodiment of a light-flashing system in accordance with the invention.

Referring to FIG. 1, a power source 1 is connected with a primary gate 4, a primary control means 2 for the primary gate 4, a plurality of light-emitting elements 8, 9 and 10, secondary gates 5, 6, and 7, and a pattern-generation means 3 for generating a pattern of signals to control the secondary gates 5, 6 and 7. The primary control means 2 controls the opening and closing of the primary gate 4. When the primary gate 4 is open, it enables the flow of current through the circuit, allowing the circuit to operate. The pattern-generation means 3 generates a pattern of signals and each generated signal separately controls the opening and closing of a respective secondary gate 5, 6 or 7. Secondary gate 5 is connected with light-emitting element 8, secondary gate 6 is connected with light-emitting element 9, and secondary gate 7 is connected with light-emitting element 10. When one of the secondary gates 5, 6 and 7 is open and the primary gate is open, the current flows through the respective light-emitting element 8, 9 or 10, allowing the respective light-emitting element to illuminate. In a preferred embodiment, the power source 1 is a battery, the primary gate 4 and secondary gates 5, 6 and 7 are transistors, the primary control means 2 is a switch, the pattern-generation means 3 is a pattern-generation circuit (e.g., a counter), and the light-emitting elements 8, 9 and 10 are light-emitting diodes (LEDs).

Note that, as used herein, the terms "connected" and "electrically connected" are defined to include a direct connection of two or more elements, or to include an indirect connection of two or more elements connected through one or more other elements. For example, the power source 1 is connected with the light-emitting elements 8, 9 and 10 through the primary gate 4 and the secondary gates 5, 6 and 7.

Figure 2:
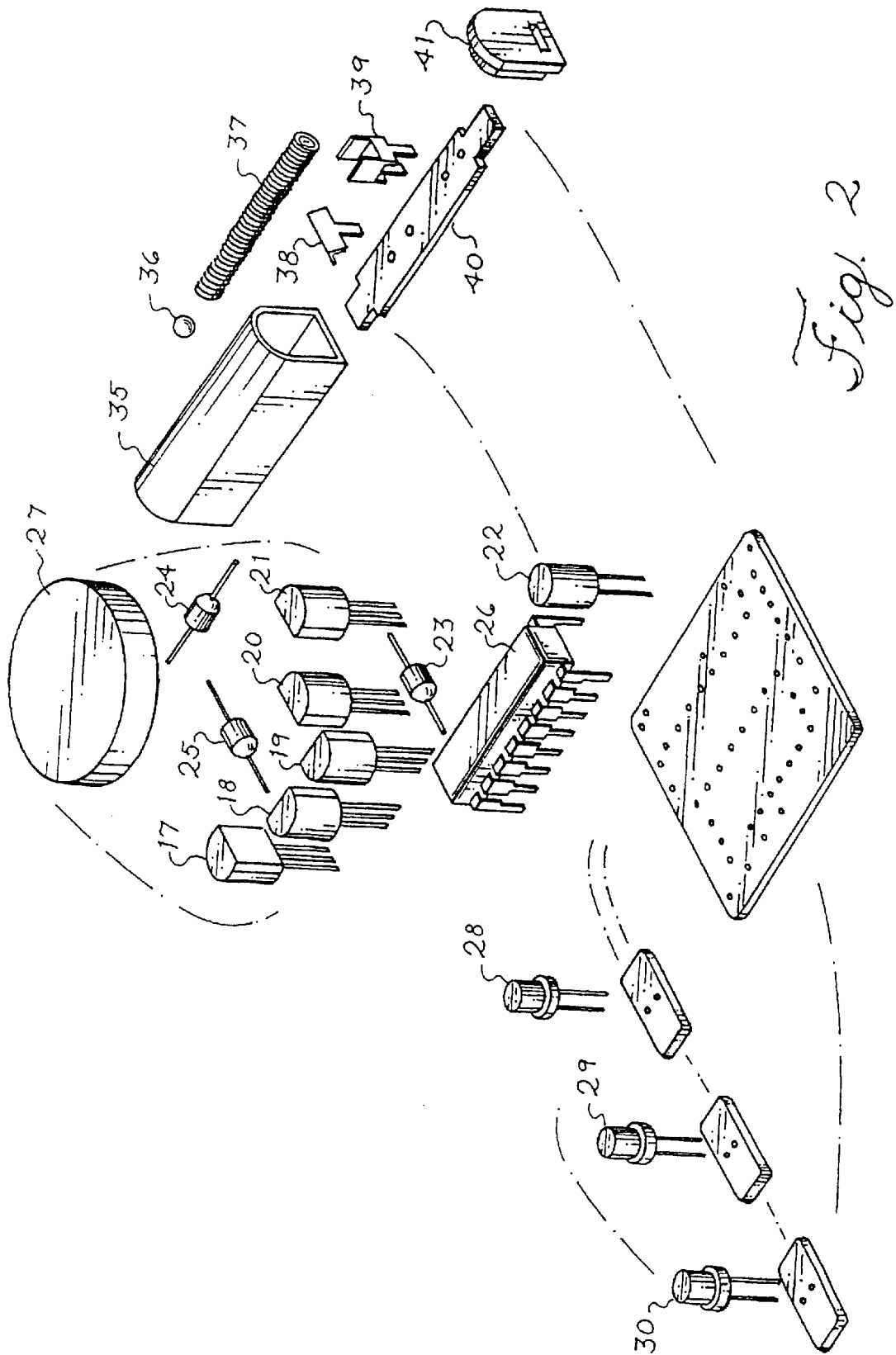
FIG. 2 is an exploded view of a preferred embodiment of a light-flashing system in accordance with the invention.
Figure 3:
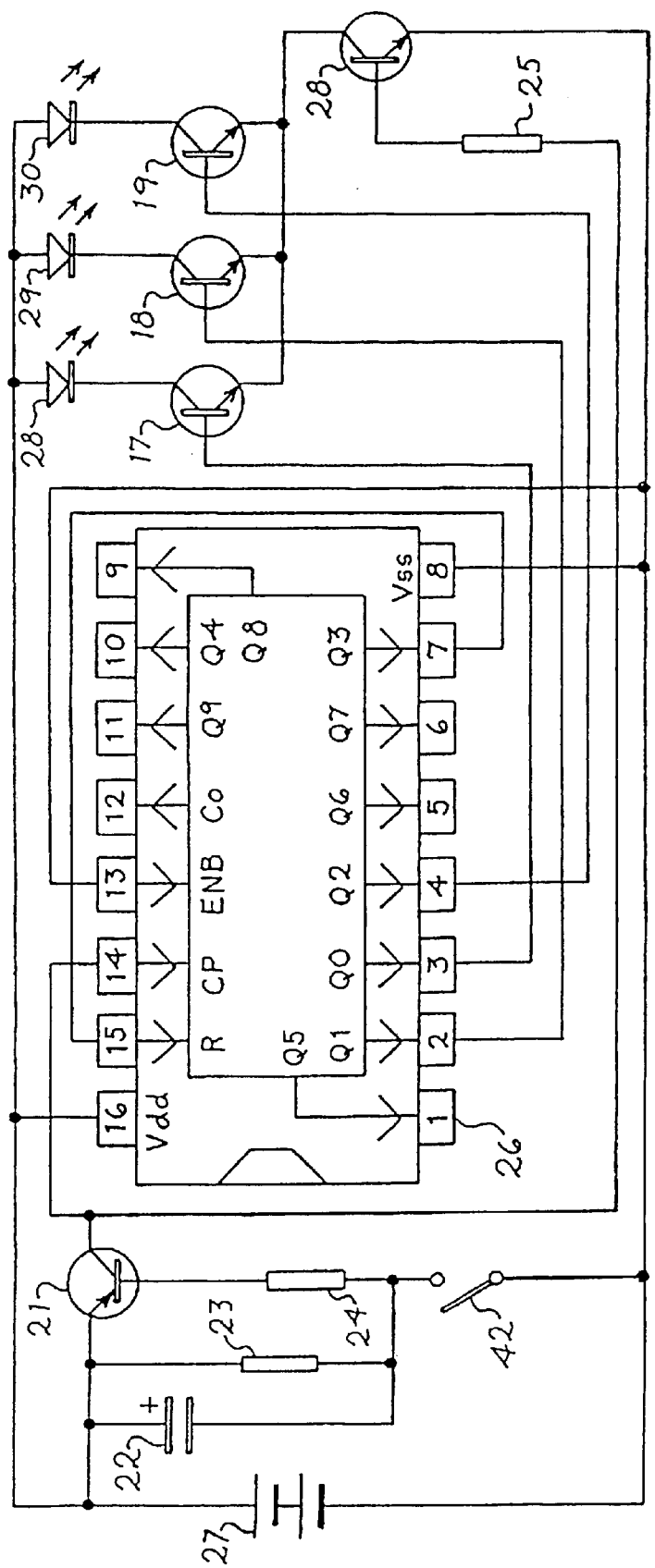
FIG. 3 is a schematic diagram of a preferred embodiment of a light-flashing system in accordance with the invention.

Referring now to FIGS. 2 and 3, the present invention creates a desired visual effect by intermittently and selectively illuminating certain ones of a plurality of light-emitting diodes (LEDs) 28, 29 and 30. A battery 27 is used as a power source for illuminating the plurality of LEDs 28, 29 and 30 and powering a pattern-generation circuit 26. The battery 27 is preferably a three-volt battery. A switch 42 (FIG. 3) intermittently clocks the pattern-generation circuit 26, which then enables the flow of current through certain ones of the LEDs 28, 29 and 30, causing them to illuminate, each time the switch 42 is closed. The switch 42 may be a switch incorporating a spring, a pressure-sensitive switch, a mercury switch, a buzzer switch, or any other suitable type of switch. The switch is shown in a preferred embodiment as incorporating a spring 37. The intermittent illumination of the LEDs 28, 29 and 30 results in a "flashing" effect as certain ones of the LEDs 28, 29 and 30 are illuminated in response to the clocking of the pattern-generation circuit 26 by the closing of the switch 42.

The battery 27 provides power to the LEDs 28, 29 and 30 and the pattern-generation circuit 26. The LEDs 28, 29 and 30 are connected selectively in series with the battery 27 through secondary gates, which are secondary transistors 17, 18 and 19 in a preferred embodiment, respectively, and a primary gate, which is a primary transistor 20 in a preferred embodiment. Three LEDs 28, 29 and 30 are shown in the present embodiment; however, any number of LEDs can be used. Furthermore, any combination of different color LEDs can be used.

In one embodiment, the primary control means, which controls the primary gate, is a switch 42, which comprises a first contact point 39, a second contact point 38, and a spring 37. The first contact point 39 is fixed to a first end of the spring 37. The first contact point 39 comprises a holder that is capable of receiving the spring 37 such that the two are electrically connected. Preferably, the spring 37 is soldered to the first contact point 39. The spring 37 is connected only at one end such that the other end is free to move in at least one range of motion in response to an inertial force applied to the system. In an alternative embodiment, the spring 37 may be equipped with a weight 36 added to the unconnected end to enhance the deflection of the spring 37 in response to the inertial force. The weight 36 could be made of metal, plastic, ceramic or other suitable material that has a sufficient mass to enhance the deflection of the spring.

The second contact point 38 is positioned with respect to the spring 37 such that it is not normally connected (i.e., normally open). The second contact point 38 is oriented such that the spring 37 contacts the second contact point 38 when the spring 37 deflects in response to the inertial force. In alternative embodiments, any type of deflection member can be used to cause contact between the first contact point 39 and the second contact point 38.

Referring again to FIG. 3, a means for generating a pattern of signals is a pattern-generation circuit 26 in a preferred embodiment. The pattern-generation circuit 26 serves to alter the pattern of illumination of the LEDs 28, 29 and 30 in response to changes in inertial forces on the system. The pattern-generation circuit 26 comprises a counter having three outputs Q0, Q1 and Q2. The pattern-generation circuit 26 is powered by the battery 27 and is intermittently clocked by the closure of switch 42. The switch 42 is connected with a transistor 21. The closure of switch 42 enables the flow of current through transistor 21, the pattern-generation circuit 26 is incremented by one count, and the output of the pattern-generation circuit 26 changes accordingly. The output of the pattern-generation circuit at each of Q0, Q1, and Q2 is a voltage that is either zero volts or three volts. These outputs are the three lowest positions of the binary sequence of the decade counter. Thus, when any of the states Q0, Q1 or Q2 is a binary 1, the output is three volts. Alternatively, when Q0, Q1 or Q2 is a binary 0, the output is zero volts. The voltage at each output changes as the counter is incremented.

The changing output voltages of Q0, Q1 and Q2 are used to selectively enable the flow of current through the secondary gates (secondary transistors 17, 18 and 19) in a pattern which, in turn, illuminates LEDs 28, 29 and 30 in a pattern. The pattern-generation circuit is preferably an integrated circuit (e.g., MC14017BCP, CD4017AF). In an alternative embodiment, the pattern-generation circuit and the external electronic components such as the transistors, capacitor and resistors can be integrated into a CMOS circuit.

The secondary transistors 17, 18 and 19 control the pattern of illumination of the LEDs 28, 29 and 30 by either enabling the flow of current through the LEDs or disabling the flow of current through the LEDs, depending on the output of the pattern-generation circuit. The secondary transistor 17 controls the illumination of LED 28 while transistor 18 controls the illumination of LED 29, and secondary transistor 19 controls the illumination of LED 30. The bases of secondary transistors 17, 18 and 19 are respectively connected with the outputs Q0, Q1 and Q2 of the pattern-generation circuit 26, and the collectors of secondary transistors 17, 18 and 19 are respectively connected with the LEDs 28, 29 and 30. Thus, the outputs Q0, Q1 and Q2 of the pattern-generation circuit 26 control the illumination of the LEDs by enabling or disabling the flow of electrical current through the LEDs.

The primary gate (primary transistor 20) enables the flow of current through each of the LEDs and secondary transistors 17, 18 and 19 when the switch 42 is closed. In a preferred embodiment, a capacitor 22 is connected in parallel with the battery 27. The capacitor 22 stores electrical charge when the switch 42 is closed and continues to enable the flow of current through transistor 21 and primary transistor 20 after the switch 42 is opened. The capacitor 22 will continue to enable the flow of current through transistor 21 and primary transistor 20, allowing certain ones of LEDs 28, 29 and 30 to illuminate until the voltage emitted from the capacitor 22 falls below 0.7 volts. The preferred capacitance of the capacitor 22 is one microfarad.

Additionally, resistors 23, 24 and 25 are provided to manage the amount of electrical current at various points in the circuit, as is well-known to those skilled in the art. The preferred resistance values of the resistors are as follows: resistor 23, 150 kilo-ohms; resistor 24, 3.3 kilo-ohms; and resistor 25, 5.1 kilo-ohms.

In a preferred embodiment, the switch 42 is encased in a switch housing 35 that is closed at one end and open at the other end. The switch housing 35 is sized and shaped to receive the switch 42. The open end of the switch housing is then sealed by the endplate 41. The switch housing is designed to allow the switch 42 within the switch housing to remain in electrical connection with the rest of the system not located within the switch housing 35. The remainder of the system, including the battery 27, secondary transistors 17, 18 and 19, primary transistor 20, transistor 21, pattern-generation circuit 26, capacitor 22, and resistors 23, 24 and 25, along with the switch housing 35 containing the switch 42, are encased in a plastic housing.

Figure 4:
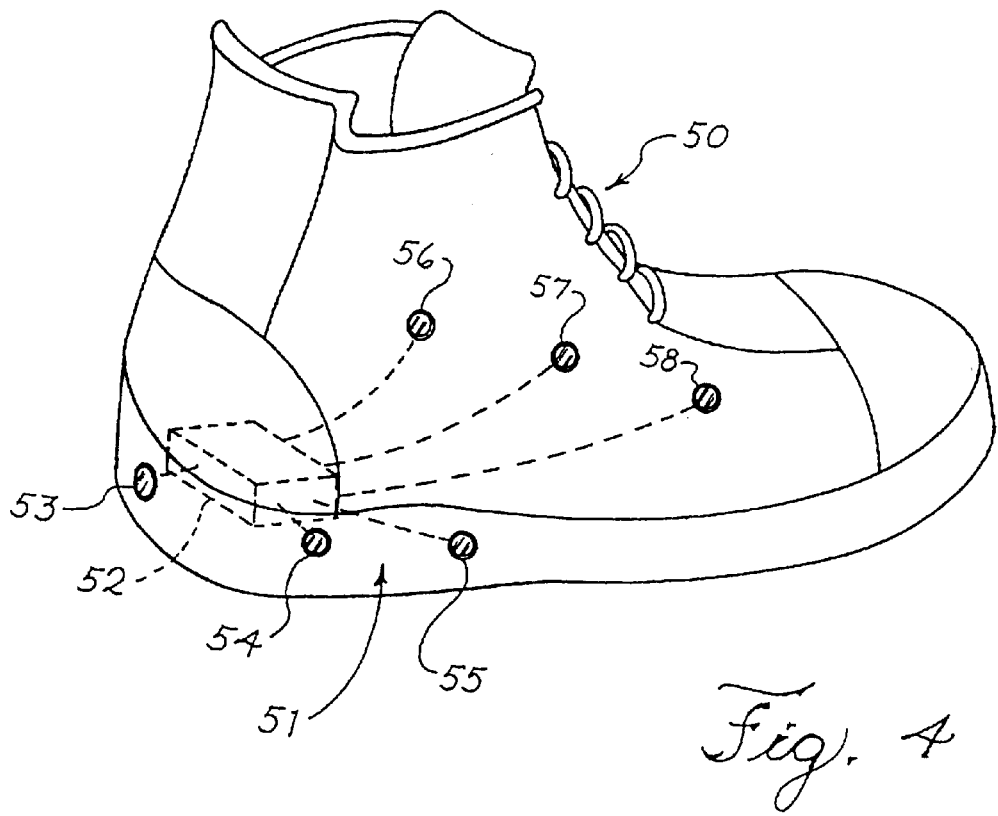
FIG. 4 is a diagram of an article of footwear containing a light-flashing system of a preferred embodiment within a sole of the footwear.

Referring to FIG. 4, a plastic housing 52 containing the components of a light-flashing system is inserted into the sole 51 of footwear 50 in a manner that is well-known in the art, and LEDs 53, 54, 55, 56, 57 and 58 are mounted so that they are visible on the outer surface of the footwear 50. It should be noted that any number of LEDs may be used and may be mounted in position on the footwear 50.

The circuitry is designed to be adaptable into footwear 50. In operation, the spring 37 deflects in response to changes in inertial forces acting on the system. The changes in inertial forces results from movement of the system, such as by the user's foot striking the ground due to a walking or running motion. The deflection of the spring 37 results in the spring 37 contacting the second contact point 38 and effectively closing the switch 42.

The closure of the switch 42 clocks the pattern-generation circuit 26 thereby changing the voltage at the outputs Q0, Q1 and Q2 of the pattern-generation circuit 26. Also, when the switch 42 is closed, current flows through the capacitor 22 and enables current to flow in transistor 21 and primary transistor 20, allowing current to flow selectively through secondary transistors 17, 18 and 19 and LEDs 28, 29 and 30. The changing output voltages of the pattern-generation circuit 26 drive the secondary transistors 17, 18 and 19 that are connected with both the outputs Q0, Q1 and Q2 and the LEDs 28, 29 and 30. The output voltages drive the secondary transistors 17, 18 and 19 such that the flow of current through each LED 28, 29 and 30 and each secondary transistor 17, 18 and 19 is either enabled or disabled. If the flow of current is enabled, the LEDs 28, 29 and 30 will light. If the flow of current is disabled, the LEDs 28, 29 and 30 will not light.

As the spring 37 moves in the opposite direction so as not to contact the second contact plate 38, the switch 42 is open. After the switch 42 opens, the capacitor 22 continues to provide current to the transistor 21 and the primary transistor 20, which, in turn, allows the battery to illuminate selective ones of the LEDs 28, 29 and 30. Thus, selective ones of the LEDs 28, 29 and 30 will continue to be illuminated after the switch 42 is opened until the voltage in the capacitor 22 falls below 0.7 volts. The entire process is repeated each time the switch 42 is closed, creating the effect of flashing the LEDs 28, 29 and 30 in a pattern each time an inertial force is applied to the system.

Figure 5:
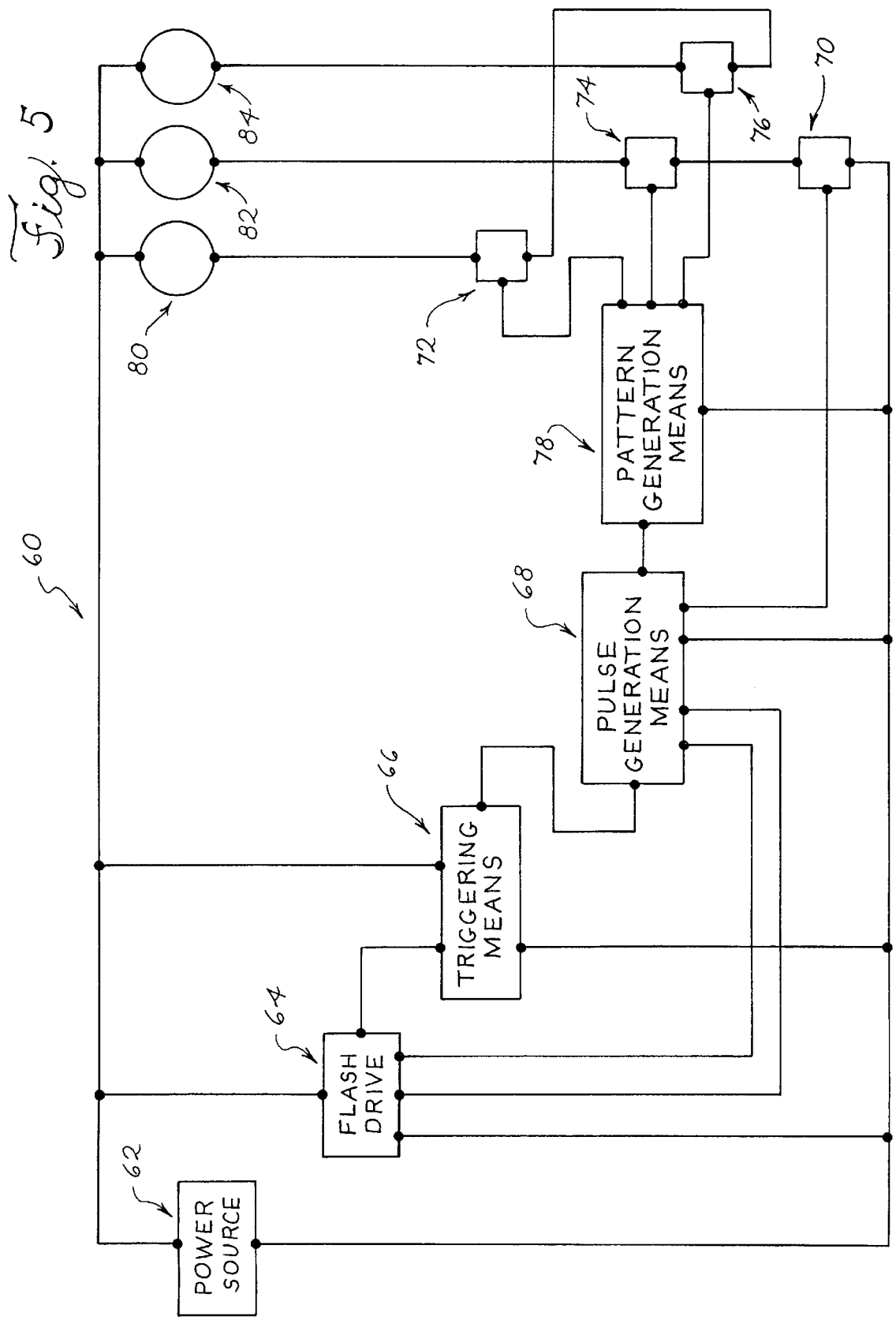
FIG. 5 is a block diagram of a preferred embodiment of a light-flashing system in accordance with the invention.

Another preferred embodiment of the present invention, disclosed in FIG. 5, is a lighting system 60 that can be incorporated into footwear. The lighting system 60 utilizes a power source 62 to energize the lighting system 60. A flash driver circuit 64 is connected with the power source 62 and a pulse-generation means 68. In operation, the flash driver circuit 64 generates a plurality of output signals which are then directed to the pulse-generation means 68. A triggering means 66 is connected with the power source 62, the flash driver circuit 64, and the pulse-generation means 68. The triggering means 66 provides a contact signal to the flash driver circuit 64 and the pulse-generation means 68. Therefore, when activated, the triggering means 66 delivers a contact signal to the flash driver circuit 64 which, in turn, generates a plurality of output signals that are directed to the pulse-generation means 68.

The lighting system 60 also includes a primary gate 70 that is connected with the pulse-generation means 68, the power source 62 and a plurality of secondary gates 72, 74, and 76. The primary gate 70 controls operation of the plurality of secondary gates 72, 74, and 76 by switching on and off the current path to the power source 62. The pulse-generation means 68 is also connected with a means for generating a pattern of signals 78 which can selectively energize each of the plurality of secondary gates 72, 74, and 76 while the primary gate 70 is conducting. The lighting system 60 has a plurality of light-emitting elements 80, 82, and 84 connected with the power source 62 and a respective one of the plurality of secondary gates 72, 74, and 76 for allowing the means for generating a pattern of signals 78 to selectively energize each of the plurality of light-emitting elements 80, 82, and 84.

During operation of the lighting system 60, the triggering means 66 delivers a contact signal to the flash driver circuit 64 which, in turn, generates a plurality of output signals that are directed toward the pulse-generation means 68. The pulse-generation means 68 utilizes the contact signal and each of the plurality of output signals from the flash driver circuit 64 to generate a series of drive pulses. The series of drive pulses causes the means for generating a pattern of signals 78 to selectively activate a respective one of the plurality of secondary gates 72, 74, and 76. The pulse-generation means 68 also activates the primary gate 70 thereby allowing each of the light-emitting elements 80, 82, and 84 to be selectively illuminated by the means for generating a pattern of signals 78. Therefore, the means for generating a pattern of signals 78 could be used to sequentially illuminate each of the light-emitting elements 80, 82, and 84 that in a preferred embodiment is mounted somewhere on the visible portion of footwear.

Referring to FIG. 6, wherein like-numbered elements depict equivalent elements found in FIG. 5, a lighting system 90 is disclosed that further comprises a timing circuit 92 connected with the triggering means 66, the pulse-generation means 68, and the power source 62. The timing circuit 92 controls operation of the pulse-generation means 68 when the contact signals from the triggering means 66 reach a predetermined time interval. The timing circuit 92 disengages the pulse-generation means 68 from driving the means for generating a pattern of signals 78 after the flash driver circuit 64 delivers the first output signal to the pulse-generation means 68 in response to a contact signal from the triggering means 66. In a preferred embodiment, the timing circuit 92 also causes the pulse-generation means 68 to disengage the primary gate 70 after the flash driver circuit 64 delivers the first output signal to the pulse-generation means 68. The timing circuit 92 remains inactive when the triggering means 66 provides the contact signals below the predetermined time interval.

Referring to FIG. 7, a preferred embodiment of the lighting system 92 is depicted in a detailed electrical circuit diagram. The timing circuit 92 comprises a resistor 94 in series with a capacitor 96. In preferred embodiments, the value of the resistor 94 is 15 k-ohms and the value of the capacitor is 47 micro-farads. In addition, a second resistor 97 is placed in parallel with the capacitor 96 which generates the output signal supplied to the pulse-generation means 68 when the contact signals from the triggering means reaches the predetermined time interval.

In a preferred embodiment of the present invention, the power source 62 comprises a three-volt battery. The flash driver circuit 64 comprises an integrated circuit. In preferred embodiments of the invention, the flash driver circuit comprises a three-LED flash driver (CMOS 8560). The three-LED flash driver is capable of generating three output pulses in a sequential flashing cycle that can be triggered by a very short input signal. Therefore, the flash driver circuit 64 delivers a plurality of output signals to the pulse-generation means 68 when triggered.

In a preferred embodiment, the triggering means 66, represented in dashed lines, comprises a switch 102 connected with the power source 62 and a gate 104 for energizing the timing circuit 92. When the switch 102 generates a contact signal, by being acted upon by external force, it causes a capacitor 106 to charge up which causes the gate 104 to conduct, thereby delivering a charge to the timing circuit 92. The contact signal is delivered to the flash driver circuit 64 by a resistor 108 which is connected with the gate 104 and a clock input of the flash driver circuit 64. In preferred embodiments of the present invention, the switch comprises a buzzer switch, a magnetic switch or a spring switch. The preferred value of the capacitor 106 is 0.22 micro-farads, the preferred value of the resistor 108 is 6.8 M-ohms and the gate 104 comprises a transistor.

In a preferred embodiment, the pulse-generation means 68 comprises an integrated circuit. The pulse-generation means 68 comprises a two-input quad NOR gate integrated circuit package. The pulse-generation means 68 is connected with a means for generating a pattern of signals 78. As depicted in FIG. 7, in a preferred embodiment of the invention, the means for generating a pattern of signals 78 comprises an integrated circuit. In the present preferred embodiment, the means for generating a pattern of signals 78 is a decade-counter. Thus, every time the pulse-generation means 68 delivers a drive signal to the decade counter, it causes one of the plurality of secondary gates 72, 74, and 76 to be energized.

In a preferred embodiment disclosed in FIG. 7, the means for generating a pattern of signals is connected with a plurality of secondary gates, 72, 74, and 76. The means for generating a pattern of signals 110 is capable of energizing a plurality of light-emitting elements 80, 82, and 84 in response to drive signals received from the pulse-generation means 68. As previously stated, the pulse-generation means 68 is also connected with the primary gate 70 which controls the operation of the plurality of secondary gates 72, 74, and 76. In the present preferred embodiment of the invention, the gate 104, the plurality of secondary gates 72, 74, and 76, and the primary gate 70 are transistors.

In operation, a preferred embodiment is capable of operating in two different lighting modes, depending on the contact signal frequency rate from the triggering means 66. When the contact signal frequency rate is slow, as the switch 102 closes, the capacitor 106 charges up and the transistor 104 begins conducting. As transistor 104 begins conducting, a charge is delivered to the flash driver circuit 64 as the voltage rises on the resistor 108. The timing circuit 92, which is connected with the triggering means 66, is also energized as a result of the switch 102 closing. As current conducts through resistor 94, the capacitor 96 begins to charge; but, because of the low contact signal frequency rate, the capacitor discharge rate through resistor 97 is faster than its charge rate. Therefore, during a slow contact signal frequency rate, the timing circuit 92 does not deliver an output signal to the pulse-generation means 68.

In a preferred embodiment, when the contact signal frequency is slow, the timing circuit 92 remains inactive. As a result, when the flash driver circuit 64 receives a contact signal from the triggering means 66, a plurality of output signals are generated by the flash driver circuit 64. Each of the plurality of output signals from the flash driver circuit 64 is connected to an input of the pulse-generation means 68. The first output signal from the flash driver circuit 64 causes the pulse-generation means 68 to deliver a drive signal to the means for generating a pattern of signals 78 and energizes the primary gate 70. As a result of the first pulse from the pulse-generation means 68, the means for generating a pattern of signals 78 therefore energizes only the first secondary gate 72. Since the primary gate 70 and the first secondary gate 72 are conducting, the first light-emitting element 80 is illuminated.

As previously discussed, the flash driver circuit 64 delivers a plurality of output signals. The second output signal from the flash driver circuit 64 is connected to the pulse-generation means 68 and causes the pulse-generation means 68 to generate a second drive signal to the means for generating a pattern of signals 78 and energizes the primary gate 70. Since the means for generating a pattern of signals 78 is a decade counter in a preferred embodiment, the second output pulse from the pulse-generation means 68 increments the decade counter and causes only the second secondary gate 74 to be energized thereby illuminating the second light-emitting element 82. As with the second output signal from the flash driver circuit 64, the third output signal from the flash driver circuit 98 causes the pulse-generation means to deliver a third drive signal to the means for generating a pattern of signals 78 and energizes the primary gate 70. As a result of the third drive signal from the pulse-generation means 68, the means for generating a pattern of signals 78 is incremented another time, thereby causing the third secondary gate 76 to be energized which illuminates only the third light-emitting element 84. Therefore, when the triggering means is delivering a contact signal at a slow frequency rate, the lighting system 93 sequentially lights the first light-emitting element 80, then the second light-emitting element 82, and the third light-emitting element 84 in response to a contact signal from the triggering means 66.

In a preferred embodiment, when the contact signal frequency from the triggering means 66 is fast, the charge rate of the capacitor 96 in the timing circuit 92 is faster than the discharge rate. As a result, during a fast contact signal rate, the timing circuit 92 is delivering an output signal to the pulse-generation means 68. The resistor 97 connected with the capacitor 96 in parallel follows the voltage of the capacitor 96. Because the capacitor 96 is charged, a voltage builds on the resistor 97 and once reaching a triggering level provides a signal to the pulse-generation means 68. As a result of the signal from the timing circuit 92, the pulse-generation means 68 stops delivering the drive signals to the means for generating a pattern of signals 78 after the first output pulse from the flash driver circuit 64. In addition, the pulse-generation means 68 disengages the primary gate 70 after the first output pulse from the flash driver circuit 64. Therefore, during a fast contact signal frequency rate from the triggering means 66, the second light-emitting element 82 and the third light-emitting element 84 do not illuminate.

Figure 8:
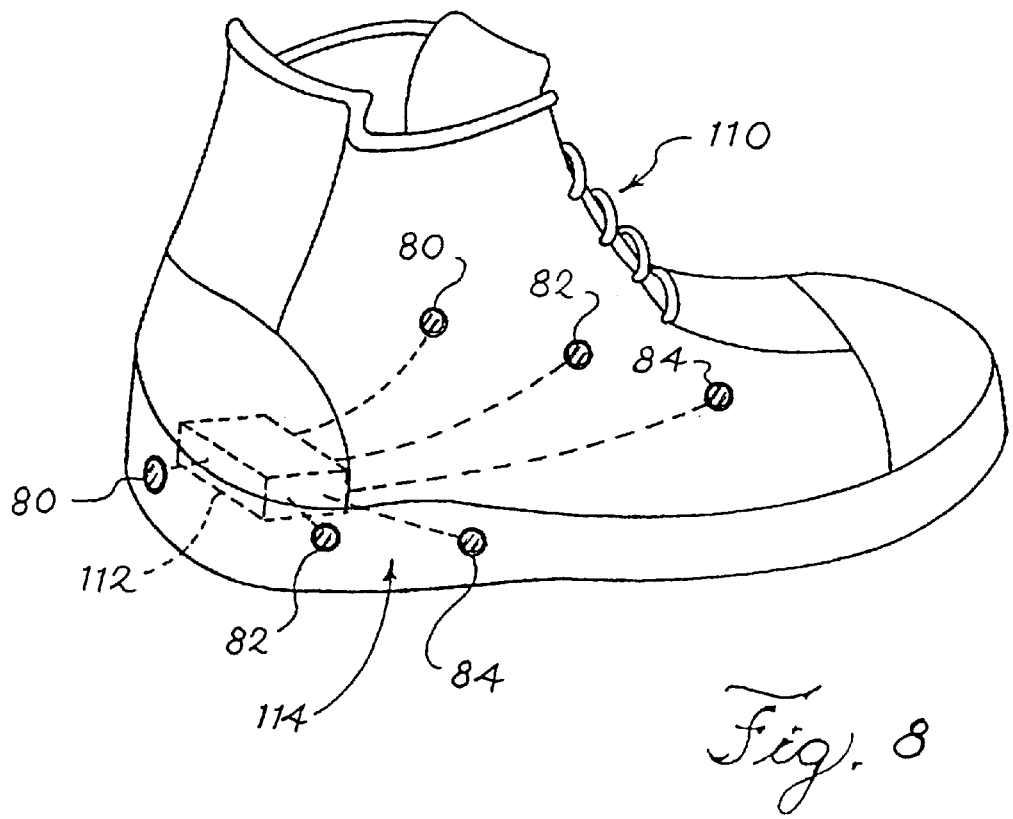
FIG. 8 is a diagram of an article of footwear containing a light-flashing system.

Referring to FIG. 7 and FIG. 8, the present invention also discloses a method of generating a flashing pattern of light illuminations for use with footwear 10. The method comprises the step of providing a power source 62. A flash driver circuit 64 is provided and connected with the power source 62 and a triggering means 66. The triggering means generates a contact signal when activated which drives the flash driver circuit 64. The pulse-generation means 68 is controlled with the output signals of the flash driver circuit and the contact signal. The method also includes the step of providing a primary gate 70 connected with the pulse-generation means 68 and a plurality of secondary gates 72, 74, and 76.

In preferred embodiments, the method also includes the step of providing a means for generating a pattern of signals 78 connected with a respective one of the plurality of secondary gates 72, 74, and 76 and an output of the pulse-generation means 68. In addition, a plurality of light-emitting elements 80, 82, and 84 are provided and each is connected with a respective one of the plurality of secondary gates 72, 74, and 76 and the power source 62. In order to illuminate the plurality of light-emitting elements, a sequence of outputs is generated with the means for generating a pattern of signals 78 in response to the drive signals from the pulse-generation means 68.

In another preferred embodiment of the present method, the method further comprises the step of providing a timing circuit 92 connected with the triggering means 66 and the pulse-generation means 68. The timing circuit 92 controls operation of the pulse-generation means 78 when the contact signals from the triggering means 66 reach a predetermined time interval. The predetermined time interval is determined by the charge rate of the resistor 94 and the capacitor 96. When the contact signal reaches the predetermined time interval, the timing circuit 92 generates an output signal to the pulse-generation means 68 through the resistor 97. As a result of this output signal from the timing circuit 92, the pulse-generation means 68 stops delivering drive signals to the means for generating a pattern of signals 78 after the flash driver circuit 64 delivers a first output signal to the pulse-generation means 68. The output from the timing circuit 92 also causes the pulse-generation means 68 to disengage the primary gate 70 after the flash driver circuit 64 delivers the first output signal to the pulse-generation means 78. The timing circuit 92 delivers an output signal to the pulse-generation means 78 by placing a resistor 97 in parallel with the capacitor 96 and connecting the resistor 97 with an input of the pulse-generation means 78. In a preferred embodiment, the resistor 97 has a value of 240 k-ohms.

Another embodiment of the present invention discloses a lighting system 112 to be incorporated into footwear 110. The lighting system 90 is comprised of a power source 62 which can be any power source commonly known in the art; but, in a preferred embodiment, is a three-volt battery. The lighting system 90 also comprises a triggering means 66 connected with the power source 62 for supplying a contact signal to a flash driver circuit 64. After receiving the contact signal, the flash driver circuit 64 generates a plurality of output signals. A pulse-generation means 68 is connected with the triggering means 66 and the plurality of output signals from the flash driver circuit 64.

The lighting system 112 also includes a means for generating a pattern of signals 78 which is connected with the pulse-generation means 68 and a plurality of secondary gates 72, 74, and 76. The means for generating a pattern of signals can sequentially energize each of the plurality of secondary gates 72, 74, and 76 in response to drive signals received from the pulse-generation means 68. A timing circuit 92 is connected with the triggering means 66 and the pulse-generation means 68. The timing circuit 92 controls operation of the pulse-generation means 68 after the contact signals from the triggering means 66 reach a predetermined time interval. A primary gate 70 is connected with the pulse-generation means 68 for controlling operation of the plurality of secondary gates 72, 74, and 76. A plurality of light-emitting elements 80, 82, and 84 are connected with a respective one of the plurality of secondary gates 72, 74, and 76 and the power source 62.

In a preferred embodiment, the timing circuit 92 remains inactive when the contact signal rate from the triggering means 66 is at slow time intervals. Once the contact signal rate from the triggering means 66 reaches a predetermined time interval, the timing circuit 92 generates an output to the pulse-generation means 68. The output signal from the timing circuit 92 causes the pulse-generation means to stop delivering drive signals to the means for generating a pattern of signals 78 when the contact signals reach the predetermined time interval. In addition, the output from the timing circuit 92 also causes the pulse-generation means 68 to disengage the primary gate 70 once the contact signals from the triggering means 66 reach the predetermined time interval. In a preferred embodiment, the time interval is set somewhere around running speed. The output from the timing circuit 92 is connected to the pulse-generation means 68 in such a manner as to allow only one of the drive signals from the pulse-generation means 68 to reach the means for generating a pattern of signals 78. Therefore, once the contact signal rate reaches the predetermined time interval, the timing circuit 92 only allows the first light-emitting element 80, 82, and 84 to be energized. The light-emitting elements 80, 82, and 84 may be light-emitting diodes.

Referring to FIGS. 6 and 8, another embodiment of the present invention discloses footwear 110 containing a lighting system 112. The shoe 110 has a sole 114 wherein the lighting system 112 is optimally positioned. The lighting system 112 has a power source 62 disposed in the sole 114 of the shoe 110. A flash driver circuit is also disposed in the sole 114 and is connected with the power source 62 and a triggering means 66. The flash driver circuit generates a plurality of drive signals and the triggering means 66 provides a contact signal to the flash driver circuit 64 thereby generating the plurality of drive signals. A pulse-generation means 66 is disposed in the sole 114 of the shoe 110 and is connected with the flash driver circuit 64 and the triggering means 66. Also disposed in the sole 114 of the shoe 110 is a means for generating a pattern of signals 78 which is connected with the pulse-generation means 68 and the power source 62. A primary gate 70 is also connected with the pulse-generation means 68 and controls operation of a plurality of secondary gates 72, 74, and 76, all disposed in the sole 114 of the shoe 110. A plurality of light-emitting elements 80, 82, and 84 are connected with the power source 62 and a respective one of the plurality of secondary gates 72, 74, and 76. The light-emitting elements 80, 82, and 84 are disposed on a visible portion of the shoe.

In preferred embodiments of the disclosed footwear, the lighting system 112 also comprises a timing circuit 92 disposed in the sole 114 of the shoe 110 that is connected with the triggering means 66 and the pulse-generation means 68. The timing circuit 92 causes the pulse-generation means 68 to stop delivering the drive signals to the means for generating a pattern of signals 78 once the contact signals reach a predetermined time interval. The timing circuit causes the pulse-generation means 68 to deactivate the primary gate once the contact signals reach a predetermined time interval. The timing circuit 92 controls the pulse-generation means 68 in a manner which allows only one of the plurality of light-emitting elements 80, 82, and 84 to be illuminated once the contact signals from the triggering means 66 reach the predetermined time interval.

Referring to FIG. 7, as previously discussed, the triggering means 66 may comprise a switch 102 that controls the overall operation of the lighting system 93. As previously discussed, in preferred embodiments of the present invention, the switch 102 may comprise a buzzer switch, a magnetic switch, or a spring switch. The spring switch is previously discussed in detail in the above specification.

Figure 9:
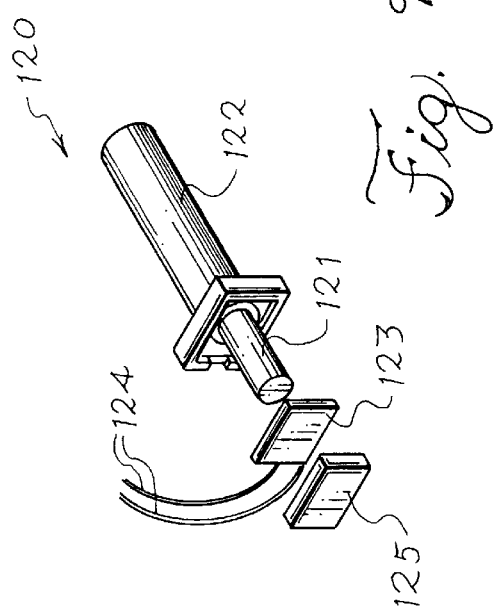
FIG. 9 is a diagram of a buzzer switch.

Referring to FIG. 9, a buzzer switch 120 is illustrated that could be utilized in a preferred embodiment of the present invention. The buzzer switch 120 is capable of generating an electric pulse in response to external force. In a preferred buzzer switch 120, a moving weight 121 moves along a buzzer stand 122 and perpendicularly hits the surface of a buzzer 123. Once the moving weight 121 makes contact with the buzzer 123, an electric pulse is generated through the wires 124. The buzzer 123 may be held in place by a stand cover 125.

Figure 10:
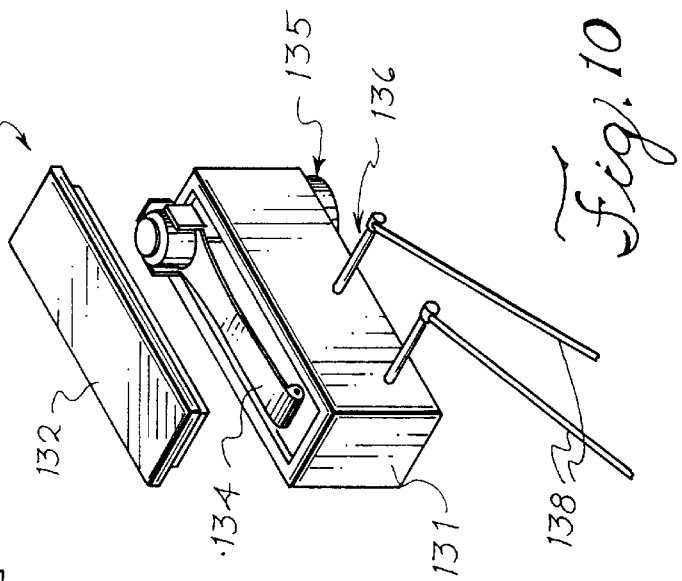
FIG. 10 is a diagram of a magnetic switch.

Referring to FIG. 10, a magnetic switch 130 may also be used as the switch 102 to control the lighting system 93 in another preferred embodiment. The magnetic switch 130 comprises a housing 131 and a housing cover 132 for holding the contents of the magnetic switch 130. A first magnet 133 is connected with a conductive plate 134 and placed inside the housing 131. A second magnet 135 is connected to the bottom of the housing 131. At steady condition, the repulsive magnetic force holds the conductive plate 134 at a position where the conductive plate 134 does not touch a conductive rod 136 which runs along the bottom of the housing 131. When the external force is greater than the repulsive magnetic force, the conductive plate 134 moves downward and touches the conductive rod 136. Therefore, when the conductive plate 134 moves down and touches the conductive rod 136, the switch is closed thereby generating an electric pulse which may be delivered to the lighting system through any common type of wire 138 attached to the conductive rod 136 and the second conductive rod 137.

Referring to FIG. 7, a plurality of resistors 103, 105, 107, and 109 are necessary to conduct current through some of the elements of the lighting system. These methods are well known in the art and one skilled in the art would recognize the reasons for using the plurality of resistors 103, 105, 107, and 109. In preferred embodiments of the present invention, the values of the plurality of resistors are 600 k-ohms and 5.1 k-ohms. Variations on these resistor values can be made without affecting the overall functionality of the lighting systems.

The present invention, therefore, allows a system for illuminating certain ones of a plurality of light-emitting elements in response to a change in the inertial forces on the system. The illumination of the light-emitting elements is controlled by gates which enable the flow of current through the use of transistors and a simple pattern-generation circuit. The pattern of illuminated light-emitting elements changes only in response to changes in the inertial forces on the system. This allows the system to operate in response to the footwear striking the ground and does not require clocking a circuit through various states or measurement of velocity of the footwear to control the changing patterns of illuminated light-emitting elements.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of the invention.

What is claimed is:

1. A lighting system to be incorporated into footwear, comprising:

a power source for energizing the lighting system;

a pulse-generation means connected with the power source;

a flash driver circuit connected with the power source and the pulse-generation means, said flash driver circuit generating a plurality of output signals to the pulse-generation means;

a triggering means connected with the power source, the flash driver circuit, and the pulse-generation means, said triggering means providing a contact signal to the flash driver circuit and the pulse-generation means;

a primary gate connected with the pulse-generation means, the power source and a plurality of secondary gates, said primary gate controlling operation of the plurality of secondary gates;

a means for generating a pattern of signals connected with the pulse-generation means for selectively energizing each of the plurality of secondary gates while the primary gate is energized;

a plurality of light-emitting elements connected with the power source and a respective one of the plurality of secondary gates for allowing the means for generating a pattern of signals to selectively energize each of the plurality of light-emitting elements.

2. The lighting system of claim 1, further comprising a timing circuit connected with the triggering means and the pulse-generation means for controlling operation of the pulse-generation means when the contact signals from the triggering means reaches a predetermined time interval.

3. The lighting system of claim 2, wherein said timing circuit remains inactive when the triggering means provides the contact signals at below the predetermined time interval.

4. The lighting system of claim 2, wherein the timing circuit comprises a resistor in series with a capacitor.

5. A lighting system to be incorporated into footwear comprising:

a power source;

a triggering means connected with the power source for supplying a contact signal to a flash driver circuit thereby generating a plurality of output signals;

a pulse-generation means connected with the triggering means and the plurality of output signals from the flash driver circuit;

means for generating a pattern of signals connected with the pulse-generation means and a plurality of secondary gates;

a timing circuit connected with the triggering means and the pulse-generation means for controlling operation of the pulse-generation means after the contact signals from the triggering means reach a predetermined time interval;

a primary gate connected with the pulse-generation means for controlling operation of the plurality of secondary gates; and a plurality of light-emitting elements connected with the secondary gates and the power source.

6. The lighting system of claim 5, wherein the timing circuit stops the pulse-generation means from delivering drive signals to the means for generating a pattern of signals when the contact signals reach a predetermined time interval.

7. The lighting system of claim 6, wherein the timing circuit allows only one of the plurality of light-emitting elements to energize in response to each of the contact signals received by the triggering means once the contact signal rate reaches a predetermined time interval.

8. Footwear containing a lighting system comprising:

a shoe having a sole;

a power source disposed in the sole of the shoe;

a flash driver circuit for generating a plurality of drive signals disposed in the sole of the shoe connected with the power source and a triggering means, said triggering means providing a contact signal to the flash driver circuit;

a pulse-generation means disposed in the sole of the shoe connected with the flash driver circuit and the triggering means;

a means for generating a pattern of signals connected with the pulse-generation means and the power source disposed in the sole of the shoe;

a primary gate connected with the pulse-generation means for controlling operation of a plurality of secondary gates disposed in the sole of the shoe; and a plurality of light-emitting elements connected with the power source and a respective one of the plurality of secondary gates disposed on a visible portion of the shoe.

\* \* \* \* \*